United States Patent [19]

Rose

[11] Patent Number: 5,566,578
[45] Date of Patent: Oct. 22, 1996

[54] POWER RECIEVING TORQUE TRANSLATING OUTPUT DEVICE

[75] Inventor: Arthur S. Rose, Seattle, Wash.

[73] Assignee: Robert Sternoff, Kirkland, Wash.; a part interest

[21] Appl. No.: 444,764

[22] Filed: May 19, 1995

[51] Int. Cl.⁶ .................. F02B 75/26; F16H 25/12
[52] U.S. Cl. ........................................ 74/57; 123/56.7
[58] Field of Search ................ 74/57; 123/56.2, 123/56.7, 56.8, 56.9

[56] References Cited

U.S. PATENT DOCUMENTS

| | | |
|---|---|---|
| 1,181,463 | 5/1916 | LaFontaine . |
| 1,352,985 | 9/1920 | Murphy .................. 123/56.8 |
| 1,918,840 | 7/1933 | Eriksen .................. 123/56.8 |
| 2,118,804 | 5/1938 | Andersen ................ 123/56.7 |
| 2,243,817 | 5/1941 | Herrmann . |
| 2,243,822 | 5/1941 | Herrmann . |
| 2,274,097 | 2/1942 | Sheerer ................... 123/56.7 |
| 2,301,175 | 11/1942 | Earnshaw et al. . |
| 2,353,313 | 7/1944 | Lane . |
| 2,445,819 | 7/1948 | Bell . |
| 2,664,866 | 1/1954 | Fulke . |
| 4,553,508 | 11/1985 | Stinebaugh ............. 123/56.7 |
| 4,597,302 | 7/1986 | McLendon, Jr. . |
| 4,834,033 | 5/1989 | Larson . |

Primary Examiner—Charles A. Marmor
Assistant Examiner—Troy Grabow

[57] ABSTRACT

A power receiving, torque translating, output device receives reciprocating power from a plurality of external power producers. The received reciprocating power is timed and controlled by a cam affixed inside a rotor rotating about a stationary central shaft. The central shaft is mounted inside an octagonal central block, and extends to provide rotatable mounting for the rotor. The rotor has a drum shaped portion so positioned as to overlap the entire length of the block thus placing the cam in close proximity rotation around the block. The block has rectangular grooves adapted to guide a plurality of cam following actuators during the reciprocating motion of each one. Each actuator derives motion from a connecting rod attached both to the actuator and to its respective external power producer. Each cycle of reciprocation of each actuator contains one power stroke in each direction for a total of two power strokes per cycle. Each actuator has a cam follower beading adapted to cause interaction between the rectangular grooves and the rotating cam. The cam has a two cycle sinusoidal profile which times the followers to two cycles of reciprocation for each revolution of the cam. Therefor, two cycles of reciprocation by the actuators will cause one revolution of the rotor which is taken as output from the outer surface of the rotor either by belts or chain or by inclusion in other external devices such as a propeller or wheel hub.

7 Claims, 4 Drawing Sheets

5,566,578

POWER RECIEVING TORQUE TRANSLATING OUTPUT DEVICE

BACKGROUND-FIELD OF INVENTION

This invention relates to improvements in power mechanisms and in particular to power mechanisms which use rotary drum cams as torque translating devices.

BACKGROUND-DESCRIPTION OF PRIOR ART

Designers of engines have long desired a better method of connecting power producing means to a load than the crankshaft. The changing leverage of the crankshaft introduces torsional stresses which are detrimental to drivetrains, and require heavy flywheels and other means to dampen out vibrations. Therefore many attempts have been made to use rotary cams in place of the crankshaft, most such attempts having met with limited success. Most forms of the cam engine have the cam as a central core while mounting power producing means co-axially around said cam, thereby limiting the size of the lever arm available for the generation of torque by the engine. One notable exception is described in U.S. Pat. No. 2,445,819 by Joseph D. Bell, Jul. 27, 1948.

In the aforementioned patent, the cams were placed to the outside of the driving mechanisms for the stated purpose of obtaining a flywheel effect from the cams. However, the Bell mechanism was very complicated, containing two counter-rotating cams and associated geadng needed to effect said counterrotation. Also problematic, was the control of torque thrust against the cam followers which, as in most other prior art, required complicated support structures.

It is accordingly an object of the present invention to provide an improved method and apparatus for controlling, and timing a plurality of power producing reciprocating linear actuators in such a manner as to allow for the most efficient torque production possible.

It is a further object of this invention to provide apparatus of the aforesaid nature of simple construction which may be economically manufactured.

These objects and other objects and advantages of this invention will be apparent from the following description,

SUMMARY OF THE INVENTION

The above and other beneficial objects and advantages are accomplished in accordance with the present invention by an improved apparatus which comprises a central block containing a round hole through its centerline and eight or more rectangular grooves arranged axially around the centerline and extending the length of the block parallel to the centerline with their open sides facing outwardly from the centerline. A stationary shaft of round section, having attachment threads on each end, is mounted through the hole in the block and secured to a mounting plate by threaded fastener means. The mounting plate contains mounting means for said central block and said stationary shaft. A rotor having an inner hub portion and a drum shaped outer portion is rotatably mounted by friction reducing bearing means to the stationary shaft. The drum shaped outer portion is adapted to overlap the full length of the block and has its outer surface adapted to mate with power output belts. The inner surface of the outer portion is adapted to mount a cam in close proximity rotation about the block. Said cam is constructed of two tubular sections with a two cycle sinusoidal groove formed into their adjacent edges.

Eight or more rectangular reciprocating actuators containing cam follower bearings are guided to linear reciprocating movement by riding within said rectangular grooves while said follower bearings simultaneously engage said cam. Each actuator derives its motion from a connecting rod attached both to the actuator and to its respective external power producer. The connecting rods may be of any length required to adapt to various required configurations. As the actuators reciprocate across the inner surface of the cam, rotary motion is imparted to said rotor as a result of said cam followers impinging on the side of the cam grooves.

Each cycle of reciprocation by each actuator contains one power stroke in each direction for a total of two power strokes per cycle. The cam has a two cycle sinusoidal profile which times the followers to two cycles of reciprocation for each revolution of the cam. Thereby allowing thirty two power strokes per revolution of the cam.

DESCRIPTION OF THE PREFERRED EMBODIMENT

Figure 1:
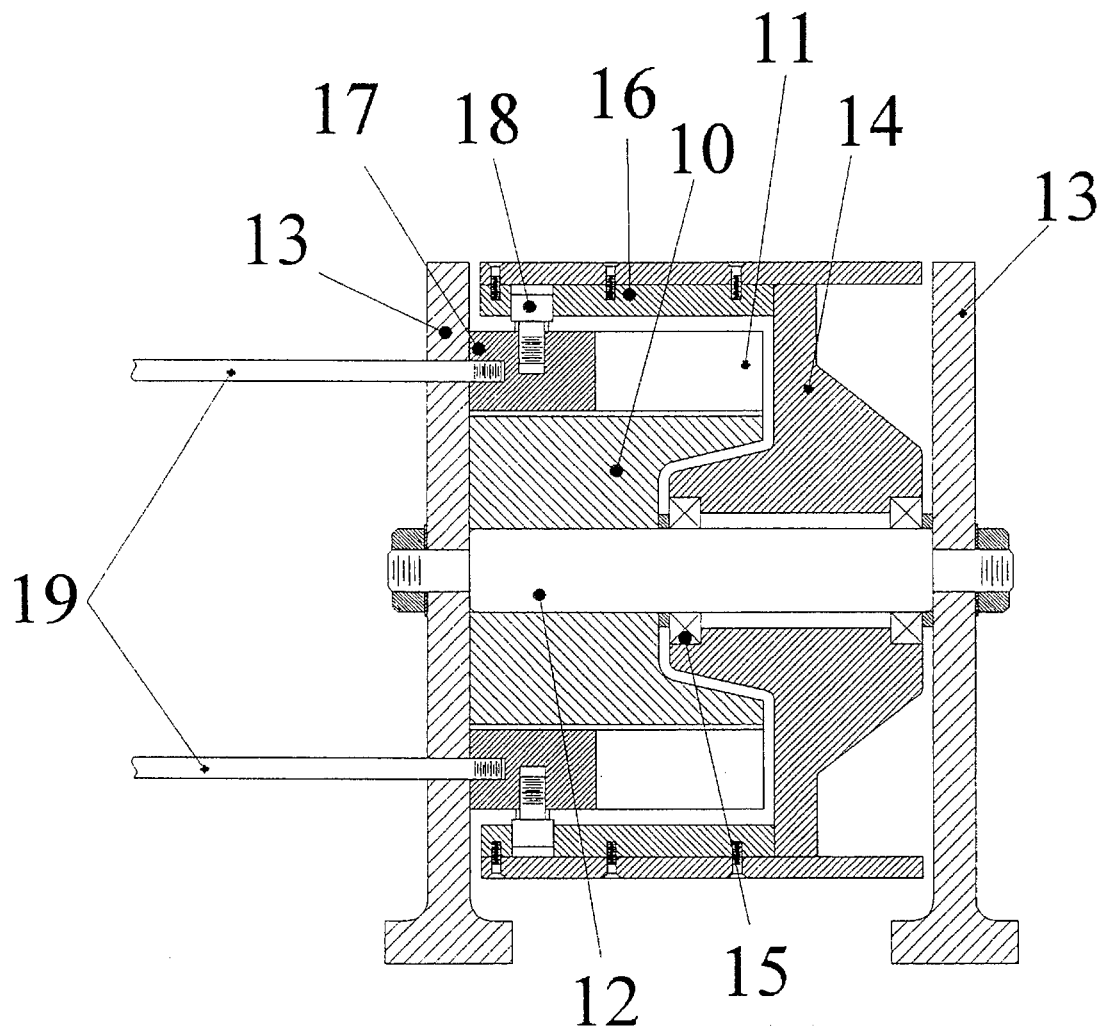
FIG. 1 is a center section side view of the preferred embodiment of this invention.

Referring to the drawings, an embodiment of the apparatus of this invention is shown comprising a block (10) of octagonal shape and cast construction having a round hole cast into the centerline of said block (10) parallel to the eight equal sides of said block(10). At least eight equally spaced rectangular grooves (11) are cast axially into said block (10) parallel to said centerline having their open sides facing outwardly from said centerline extending the length of said block (10). A shaft (12) of round section having attachment threads on each end is fitted through said round hole and protrudes at each end of said block (10). At least one mounting plate (13) having an attachment seat for said shaft (12) and fastening means to secure said block (10) to said mounting plate. A rotor (14) having an inner hub portion and a drum shaped outer portion is rotatably mounted by friction reducing bearing means (15) to said stationary shaft (12). The drum shaped outer portion is adapted to overlap the full length of said block (10) and has its outer surface adapted to mate with power output belts. The inner surface of the outer portion is adapted to mount a cam (16) in close proximity rotation about said block (10). Said cam (16) is constructed of two tubular sections with a two cycle sinusoidal groove formed into their adjacent edges.

At least eight actuators (17) of rectangular shape are adapted to reciprocate in said rectangular grooves (11) and have cam follower bearings (18) affixed by threaded fastener means perpendicular to said actuators (17) adapted to intersect and cooperate with said cam (16). At least eight connecting rods (19) having attachment threads on each end are adapted to connect said actuators (17) to external devices capable of producing reciprocating power.

Figure 2:
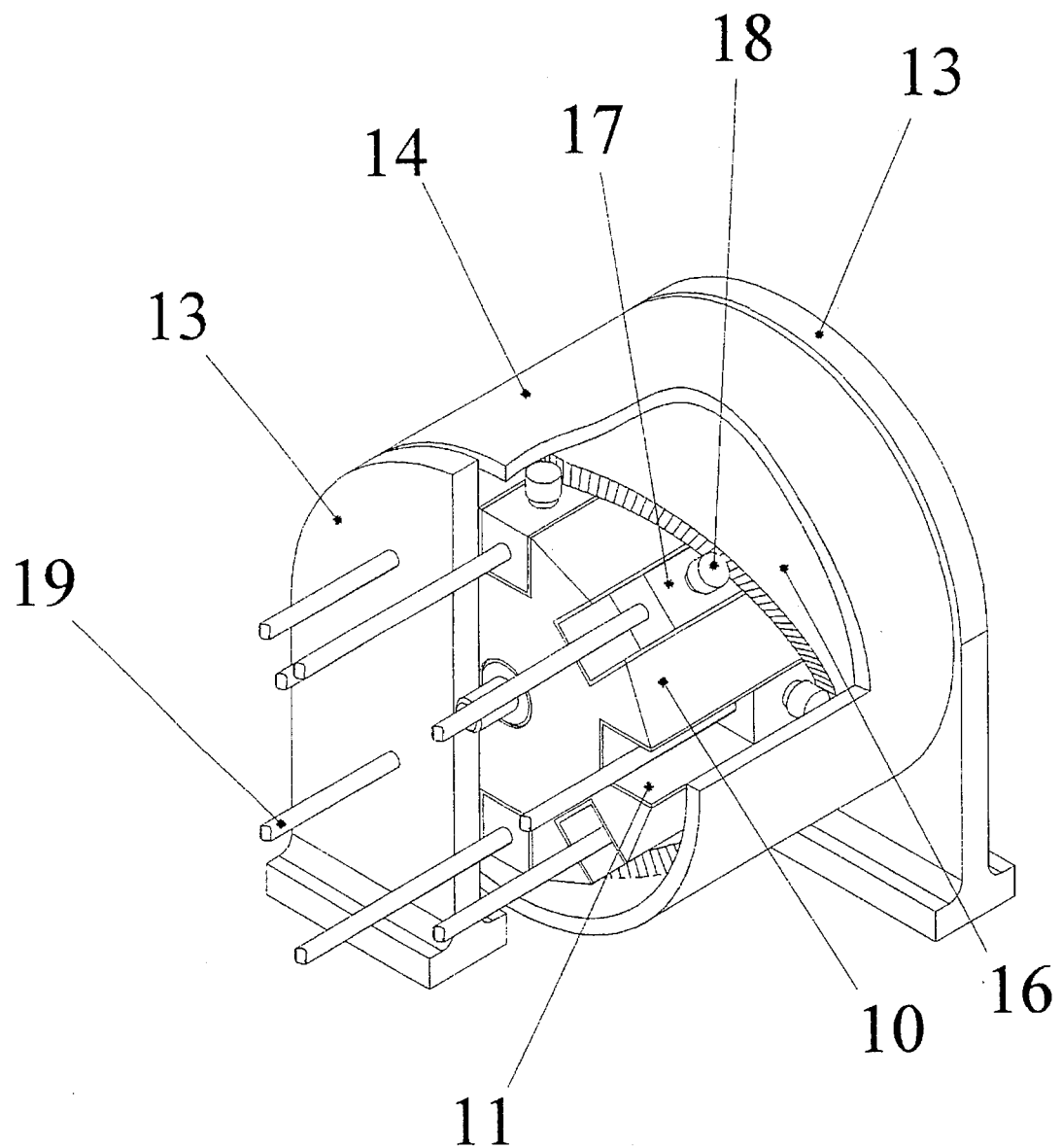
FIG. 2 is a partially sectioned isometric view of the embodiment of FIG. 1.
Figure 3:
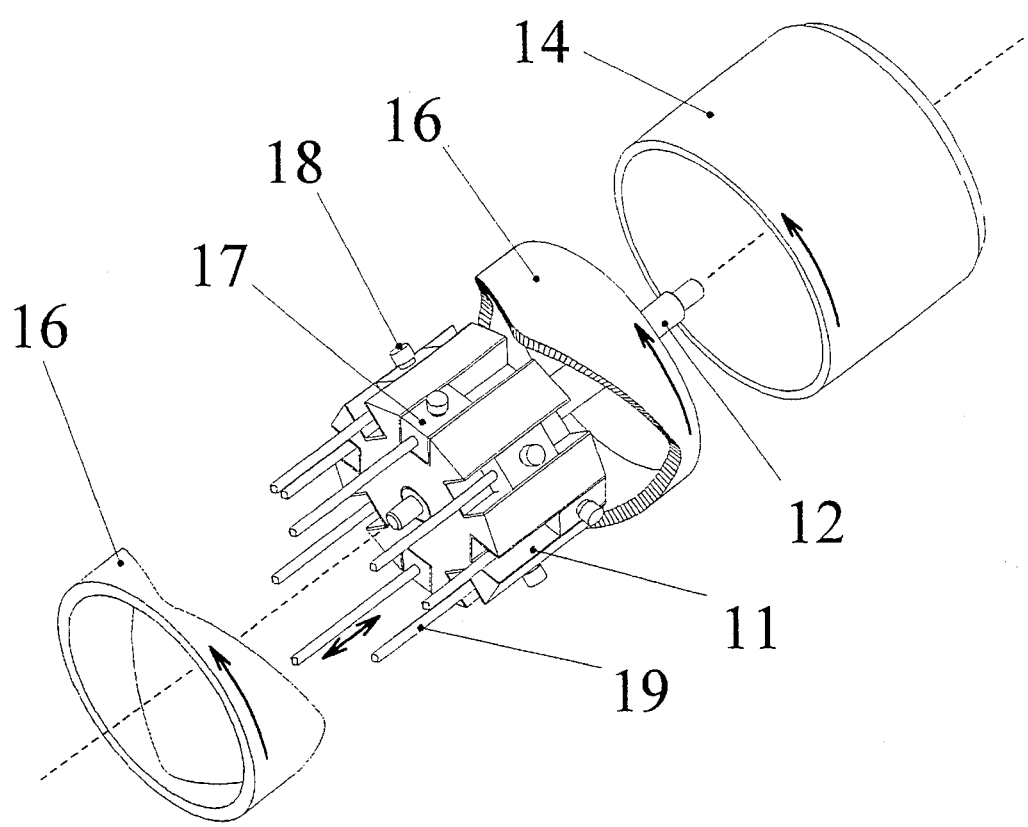
FIG. 3 is an exploded view of the major working parts in isometric representation.
Figure 4:
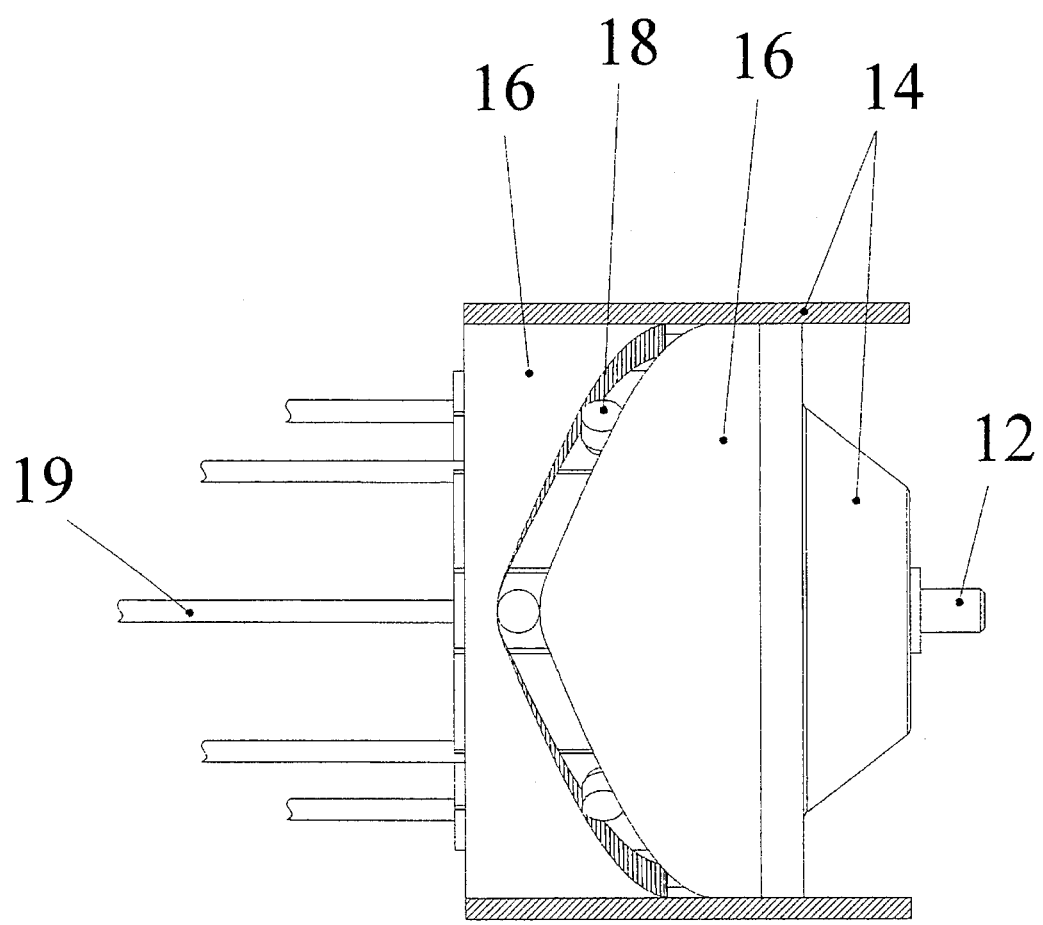
FIG. 4 is an assembled side view of the parts in FIG. 3.

Referring to FIGS. 2, 3, and 4, the relationships of actuators (17) to each other is shown as well as the two piece construction of the cam (16) which allows for simple assembly of the apparatus core prior to insertion into the rotor (14).

In operation, reciprocating motion of connecting rods (19) cause corresponding motion of the actuators (17) in their corresponding rectangular grooves (11) to drive the cam follower bearings (18) against the grooves of the cam (16) causing rotary motion of the rotor (14) about the stationary shaft (12). The cam (16) is adapted to time, and control reciprocating motion of all actuators to balance and cancel all vibration within the device.

The generation of reciprocating power for use by this device is intended to be supplied by industry standard means selected from the group consisting of electromagnetic solenoid, compressed air cylinder, hydraulic ram, sterling cycle, two cycle internal combustion, or steam cylinder. Rotary output from the device may be by power belt or by installation within external devices selected from the group consisting of propeller hubs or wheel drums for direct output.

In the preferred embodiment the cam is a two cycle sinusoidal cam which times and controls the actuators through two reciprocating cycles per revolution of the cam. Each cycle of reciprocation by each actuator contains one power stroke in each direction for a total of two strokes per cycle. In combination with eight actuators this allows for 32 power strokes per revolution, more than any other known reciprocating device. It may be seen from FIG. 3 that actuators which are 180 degrees of cam rotation from each other will be moving the same direction, while actuators on the 90 degree points will be moving in the opposite direction thus canceling all lateral forces and vibration in the device. Each power stroke consists of 45 degrees of cam rotation and includes four actuators, as does each off stroke.

The foregoing description is included to illustrate the operation of the preferred embodiment and is not meant to limit the scope of the invention. From the foregoing description, variations will be apparent to those skilled in the art which would yet be encompassed by the spirit and scope of the invention, therefore the scope of the invention is to be limited only by the following claims.

What is claimed is:

1. A power receiving, torque translating, output device comprising:

(a) a block of octagonal shape and cast construction having a round hole cast into the centerline of said block parallel to the eight equal sides of said block, at least eight rectangular grooves cast axially into said block parallel to said centerline having their open sides facing outwardly from said centerline, fastener receiving threads;

(b) a stationary shaft of round section having attachment threads on each end, fitted through said round hole protruding at each end of said block;

(c) at least one mounting plate having an attachment seat for said shaft and fastening means to secure said block and apertures for connecting rods;

(d) a rotor having a hub portion having friction reducing beating means rotatably mounted to said stationary shaft, a drum shaped outer portion adapted to overlap the full length of said block, the drum having an outer surface adapted to mate with power output belts, and an inner surface adapted to mount a cam in close proximity for rotation about said block;

(e) a cam affixed inside said rotor having two tubular portions whose adjacent edges form a two cycle sinusoidal groove of substantially rectangular cross section;

(f) at least eight actuators of rectangular shape adapted to reciprocate in said rectangular grooves;

(g) at least eight cam follower bearings attached by threaded fastener means perpendicular to said actuators adapted to intersect and cooperate with said cam; and (h) at least eight connecting rods having attachment threads on each end adapted to connect said actuators to external devices capable of producing reciprocating power.

2. The device of claim 1 wherein said device is utilized to translate reciprocating motion from a plurality of external power producing means selected from the group consisting of an electromagnetic solenoid, compressed gas cylinder, hydraulic ram, sterling cycle, two cycle internal combustion, or steam cylinder.

3. The device of claim 1 wherein power input from external power producers cause said actuators to reciprocate within said rectangular grooves causing said cam follower bearings to impinge on the groove of said cam imparting rotary motion to said rotor.

4. The device of claim 1 wherein said cam times and controls the reciprocating motion of all said actuators to balance and cancel all vibration within the device.

5. The device of claim 1 wherein translation from reciprocating motion to rotary motion may be accomplished at some various distance from power generation by adapting the length of said connecting rods to fit various configurations.

6. The device of claim 1 wherein said device is utilized with two mounting plates supporting said shaft allowing heavy duty output belts to be used around the rotor on high power configurations.

7. The device of claim 1 wherein said device is utilized with one mounting plate supporting both said block and said shaft thereby allowing said rotor to be installed inside other devices selected from the group consisting of propeller hubs and wheel drums for direct output.

* * * * *